R. COOKE.
Machines for Shearing Hats.
No. 145,052. Patented Dec. 2, 1873.
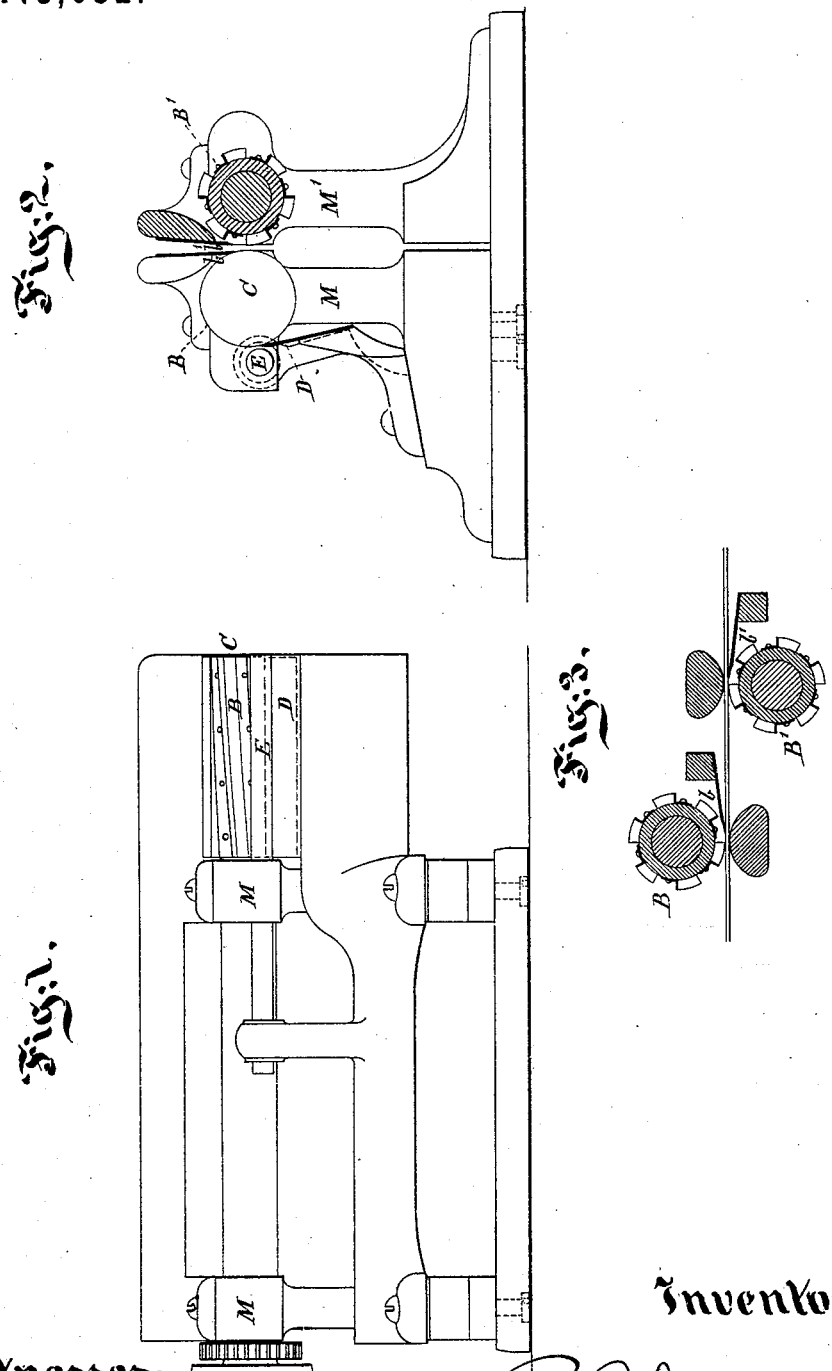

UNITED STATES PATENT OFFICE.

RICHARD COOKE, OF NEW HARTFORD, NEW YORK.

IMPROVEMENT IN MACHINES FOR SHEARING HATS.

Specification forming part of Letters Patent No. 145,052, dated December 2, 1873; application filed April 10, 1873.

*To all whom it may concern:*

Be it known that I, RICHARD COOKE, of New Hartford, Oneida county, New York, have invented certain new and useful Improvements relative to Machines for Shearing Hats; and I do hereby declare that the following is a full and exact description of what I consider the best means of carrying out the same. The accompanying drawings form a part of this specification.

Figure 1 is a side elevation. Fig. 2 is an end view, partly in section.

The revolving shears and leger-knives are mounted to act on the two sides of a brim, directly adjacent to each other.

The additional figure shows a modification, briefly described further on.

Similar letters of reference indicate corresponding parts in all the figures.

M M' are adjustable frame-pieces, which form supports for the revolving shears. B B' are revolving shears. They are formed of rigid material, as iron or steel, properly mounted in fixed bearings on the parts M M', so as to overhang or project, and leave their ends free, as shown. They carry sharp steel cutters, adapted, by the aid of leger-knives b b', to remove the projecting nap or raised pile on both the upper and lower surfaces of the hat-brims, which are guided between them by the hands or other suitable means. My machine is adapted to shear hats with previously teasled or furry surfaces, whatever may be the mode of manufacture of the main body, and whatever may be the character of the fur or nap. I have experimented mainly on hats with knit bodies, the material being wool of various grades, having its surface abraded by teasling or gigging. The end of each revolving shear is protected by a covering-case, which is smooth, and may press firmly against the crown of the hat without inducing any injury. In order to shear the crowns and tips of the hats, I can use a separate shearing-machine, if preferred; but I have arranged to accomplish this end by means of the same shear B, with the use of an additional leger-knife, D. While shearing the brims on the two surfaces by the use of both the shears B B' and the leger-knives b b', the leger-knife D is of no effect; but when shearing the crowns the hats are held successively in contact with the leger-knife D. It being understood that the hat-body is supported by being stretched on a suitable block, held at a proper level, the hat is turned slowly in contact with the leger-knife D, and the crowns and tips are sheared by the action of the revolving shear B, the hat, with its supporting-block and shaft, requiring to be changed in position to effect shearing their respective surfaces, as will be obvious. It will be observed that the smooth casing C on the end of the revolving shear B is important in this operation of shearing the crown, because the end of the shear B is necessarily caused to touch the upper surface of the brim, and the casing of the shear renders it harmless. The revolving shear B performs a double duty, shearing one side of the brim and the entire surface of the crown and tip. The other shear, B', is useful only in the shearing of the brim. In case any accident disables the shear B', I can temporarily execute the entire work by the single shear B and the single leger-knife D, shearing only one side of a brim at a time. To effect this I provide an overhung supporting-bar, E, so mounted in the framing M as to be readily moved endwise out of the way. When the other parts of the machine are in operation this bar is kept back, but when it becomes necessary to shear a brim by its aid it is drawn forward into the position indicated in Fig. 1, where its front end is just flush with the smoothly-cased end of the shear B. The space between this bar E and the shear B is just sufficient for the thickness of a brim. To shear a brim with its aid the hat may be held on the same block, with its brim projecting unsupported. After introducing the brim between the supporting-bar E and the shear B, the hat is slowly turned, and one surface of the brim is sheared entirely around; then the hat is withdrawn, and the brim again introduced with its other face presented toward the shear B and leger-knife D. In this position the hat is again turned slowly and the brim is completed. This method of operating produces perfect surfaces on the brim and on the crown. As it is liable to leave a portion imperfectly sheared at the junction, the hat should be peculiarly blocked before shearing with reference to this, so that a little more of the material will be thrown into the brim during the shearing process than is intended to be finally left. Then the subsequent blocking, with only the right amount in the brim, brings the badly-sheared zone a little above the line of junction where it will be covered by the band. I have shown provisions for adjusting the several knives and for setting the revolving shears B B' nearer together or farther apart, the importance of which will be readily appreciated, and which call for no detailed description. It is important that the removable supports which hold the several leger-knives be made sufficiently stiff to avoid trembling.

I believe it practicable to shear the surfaces of brims by means of end cutters, or cutters mounted radially on the end of a revolving shear, the shear being mounted with its axis perpendicular to the brim. In such case I can realize a great portion of the good effect of my end casing C by putting an analogous casing or band around the cylindrical surface adjacent to the end.

Fig. 3 is a cross-section of a modification, in which the two shears and two leger-knives are not placed adjacent to each other, but are set to act successively. Each has necessarily a supporting-surface to hold the brim to its work.

I can mount the shears B B', with their corresponding leger-knives, in several different positions. In Fig. 2 they are shown side by side, or directly adjacent to each other. When thus arranged the shafts should be geared so that the cutters or knife-edges in each set will avoid coming in contact with, or exactly opposite to, a knife in the opposite shear. The necessity for this precaution may be avoided by mounting the revolving shears at a considerable distance apart, as indicated in Fig. 3. In Fig. 2 the shears are as close together as the arrangement will allow.

The revolving cutters B B' may be cylindrical, as shown, or they may be conical.

The breadth of the brims of the hat may vary, in practice, within wide limits. I propose to make the revolving shears and leger-knives long enough for the widest.

I claim as my invention—

1. The two overhung or projecting revolving shears B B', and two corresponding leger-knives, $b\ b'$, arranged to operate relatively to each other and to a hat-brim passed between them, substantially as and for the purposes herein set forth.

2. The two leger-knives $b$ and D, arranged, as shown, relatively to the same revolving shear B, so that one, $b$, is available in shearing both sides of the brim, and, on changing the position of the hat, the other, D, becomes available for shearing the crown and tip.

3. The smooth casing C, arranged on a projecting revolving shear, B, and adapted to serve therewith in shearing into the angle between the brim and crown of hats, as specified.

4. The combination, in a single organized machine, of the two revolving shears B B' and corresponding leger-knives $b\ b'$, with the additional leger-knife D, mounted on the opposite side of one of the revolving shears, as and for the purposes specified.

5. The projecting supporting-bar E, combined and arranged to operate with the revolving shear B, casing C, and leger-knife D, as herein specified.

In testimony whereof I have hereunto set my hand this 5th day of April, 1873, in the presence of two subscribing witnesses.

RICHARD COOKE.

Witnesses:
F. J. COOKE,
L. B. ROOT.